Sept. 6, 1932. J. O. DAVIS 1,876,135
FLYBACK RATCHET DRIVE
Filed April 25, 1931 3 Sheets-Sheet 1

Inventor
James O. Davis,

By Hood + Hahn.
Attorneys

Sept. 6, 1932.     J. O. DAVIS     1,876,135
FLYBACK RATCHET DRIVE
Filed April 25, 1931     3 Sheets-Sheet 2
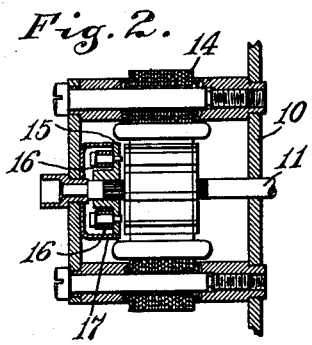
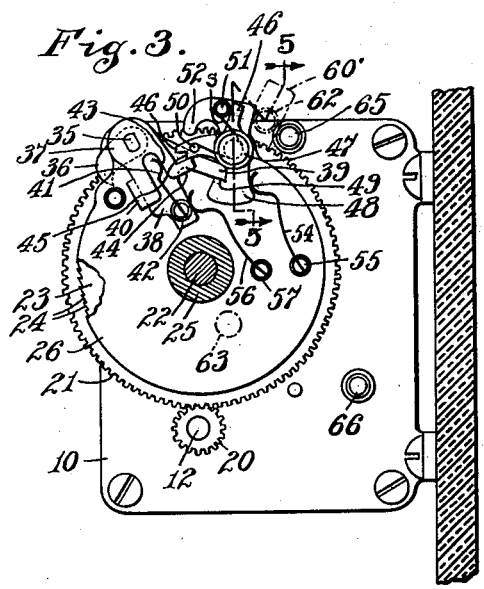
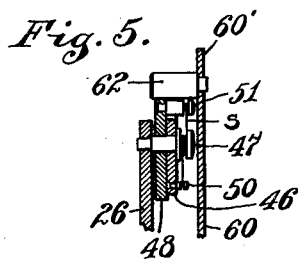
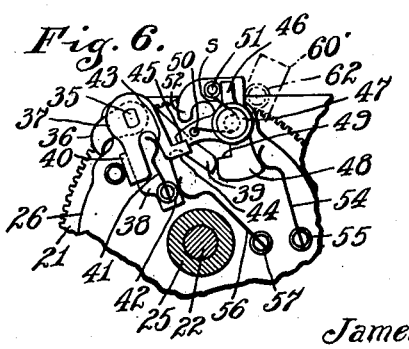
Inventor
James O. Davis,
By Hood + Hahn.
Attorneys Sept. 6, 1932. J. O. DAVIS 1,876,135
FLYBACK RATCHET DRIVE
Filed April 25, 1931 3 Sheets-Sheet 3

Inventor
James O. Davis,
By Hood + Hahn.
Attorneys

Patented Sept. 6, 1932

1,876,135

UNITED STATES PATENT OFFICE

JAMES O. DAVIS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

FLYBACK RATCHET DRIVE

Application filed April 25, 1931. Serial No. 532,859.

The object of my invention is to provide a ratchet driving mechanism between a continuously moving motor and an isolated driven element of such character that the oscillating driven element may be disconnected from the driving motor at any desired point in its travel and automatically returned to an initial position, the parts being so designed that driving connection with the motor will be automatically re-established when, and only when, the oscillating element has been returned to its initial position.

The device has been primarily designed for use in a control mechanism for stokers in which the oscillating element carries circuit-controlling elements.

The accompanying drawings illustrate my invention.

Figure 1:
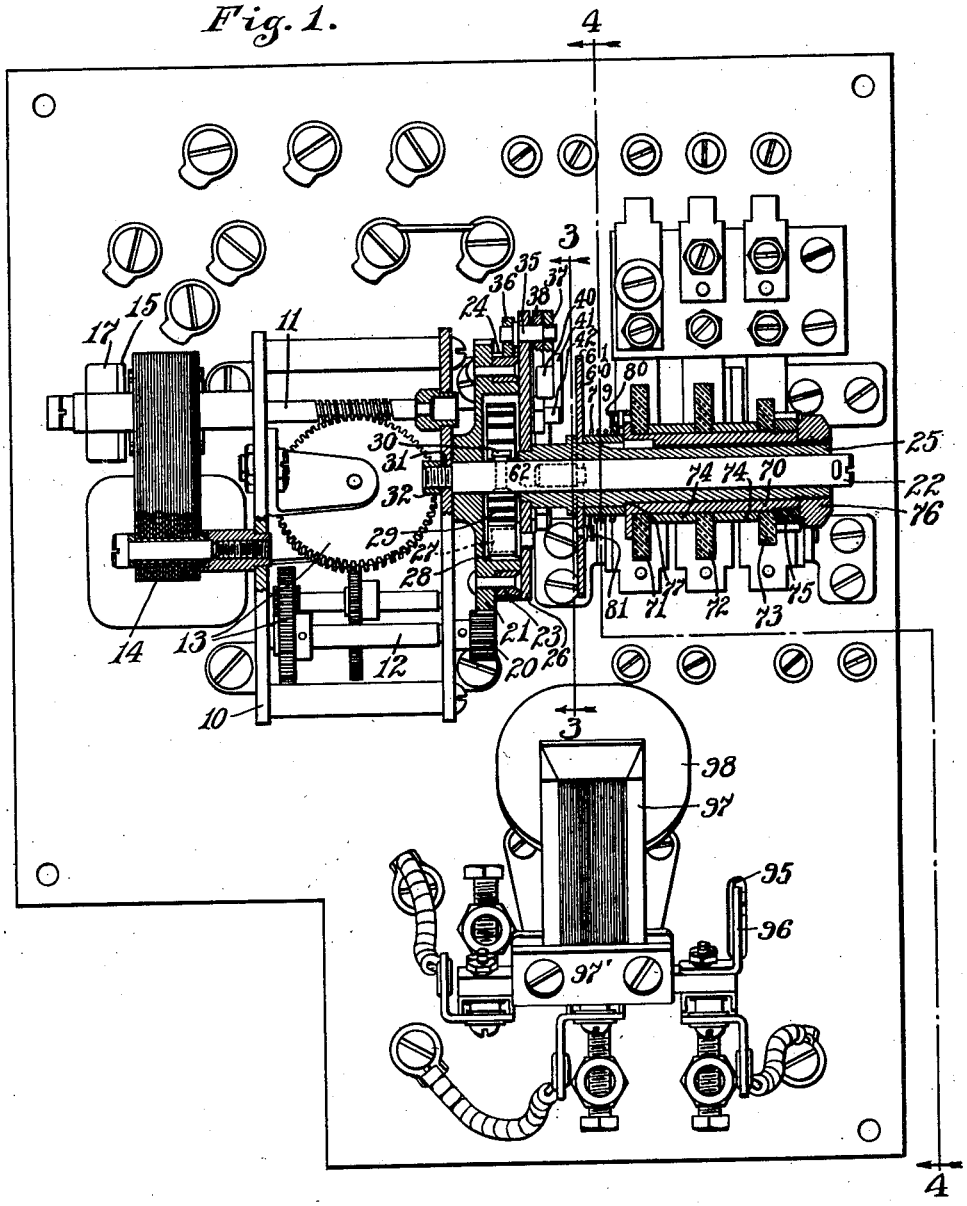
Figure 4:
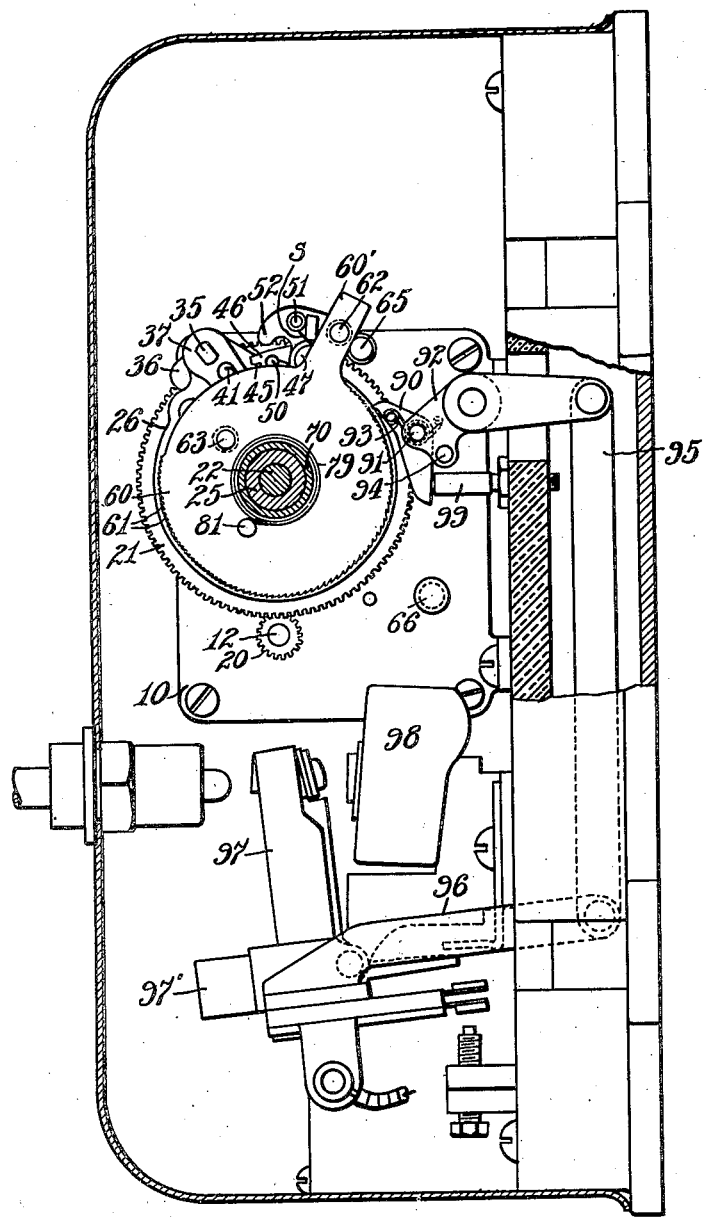

Fig. 1 is an elevation, in partial section, of my device;

Fig. 2 a fragmentary section in the plane of the rotor shaft of the motor;

Fig. 3 a section on line 3—3 of Fig. 1;

Fig. 4 a section on line 4—4 of Fig. 1;

Fig. 5 a section on line 5—5 of Fig. 3; and

Fig. 6 a fragmentary section in the plane of Fig. 3 with the latch mechanism in the positions assumed when the driving pawl is held retracted.

In the drawings 10 indicates a suitable supporting frame in which is mounted a power-receiving shaft 11 and a power delivery shaft 12 with an intermediate speed-reducing train 13 of any desired character. Shaft 11 is conveniently the rotor shaft of an electric motor 14 and this shaft carries a flange 15 upon which are pivoted two arc-shaped friction shoes 16 which lie within a stationary shell 17. The shoes 16 are so formed that, when shaft 11 is rotating at full speed, said shoes will hug the shaft but, as the speed of shaft 11 drops below normal, said shoes, as they pass beneath the shaft, will drag upon the inner surface of the stationary shell 17 which encloses the shoes, said shoes thus having a braking effect to hasten stoppage of the motor.

The power delivery shaft 12 carries a pinion 20 which meshes with a gear 21 journaled upon a stud pin 22 supported upon frame 10 and gear 21 carries a hardened ratchet ring 23 provided with ratchet teeth 24.

Journaled upon stud 22 is a sleeve 25 which is to be automatically oscillated through various arcs from an initial position by the mechanism now to be described.

Secured to that end of sleeve 25 adjacent gear 21 is a plate 26 having a pin 27 projected into a spring chamber 28 formed in gear 21. Pin 27 forms the anchorage for one end of a volute spring 29 nested in chamber 28 and having its inner end attached, at 30, to stud 22.

In order to set spring 29 at any desired tension stud 22 is journaled, at 31, in frame 10 and may be held in any desired position of angular adjustment by nut 32 threaded on to stud 22 and engaging frame 10.

Journaled in plate 26 is a pawl shaft 35 carrying, at one end, a pawl 36 overlying and adapted to engage the ratchet teeth 24, and at the other end a lever 37, the parts 35, 36 and 37 being secured together to rotate as a unit about the axis of shaft 35.

Journaled upon shaft 35, between lever 37 and plate 26, is a pawl-retracting lever 38 having a latch finger 39. Lever 37 is provided with a laterally-extended finger 40 which overlies and has a one-way engagement with lever 38, being normally yieldingly retained in engagement with lever 38 by a spring 41 anchored at 42 on lever 38 and engaging lever 37 at 43. Lever 37 is provided with a latch finger 44 with which cooperates a shoulder 45 of a latch lever 46 pivoted at 47 on plate 26. Also pivoted at 47 is a latch lever 48 having a latch shoulder 49 adapted to cooperate with finger 39 of lever 38. Lever 46 is urged in a counter-clockwise direction (Fig. 3) relative to lever 48 by a spring s, one end of which is anchored at 50 on latch 46 and the other end of which is anchored on a pin 51 on latch lever 48, said pin 51 serving as a stop to limit counter-clockwise movement of lever 46 relative to lever 48. Latch lever 48 is provided with a finger 52 which overlies, and under some conditions is adapted to engage, lever 38, in one direction, to shift said lever in a clockwise direction. Lever 48 is yieldingly urged in a clockwise direction by a spring 54 anchored at 55 on plate 26. Lever 38 is yieldingly urged in a clockwise direction by a spring 56 anchored at 57 on plate 26.

When pawl 36 is in effective position relative to the ratchet teeth 24, the parts are in the positions shown in Fig. 3, at which time finger 39 of lever 38 is restrained in its uppermost position by resting upon shoulder 49 of lever 48; finger 44 of lever 37 lies under lever 46 with its end free from shoulder 45 of lever 46; and finger 40 of lever 37 lies in engagement with lever 38.

Journaled upon sleeve 25 is a ratchet disc 60 provided with a segmental series of ratchet teeth 61. Disc 60 is provided with pin 62 (Fig. 4) which is projected into the plane of lever 48 beyond its axis so as to be capable of swinging lever 48 in a counter-clockwise direction. Ratchet disc 60 is also provided with a pin 63 projected into the plane of lever 38 and adapted to move said lever, against the action of spring 56, in a counter-clockwise direction.

The pin 62 is carried by a projecting finger 60' of disc 60 and projected into the path of movement of this finger is a stationary finger 65 carried by the frame 10 to limit the movement of disc 60 in a clockwise direction.

Movement of disc 60 in a counter-clockwise direction is limited by a stationary pin 66 carried by frame 10.

Splined upon sleeve 25 is a sleeve 70 upon which are sleeved a plurality of switch-actuating cams 71, 72, 73, with interposed spacers 74 and held in relative angular adjustment by a nut 75 threaded upon the outer end of sleeve 70. The locking nut 76, threaded upon the outer end of sleeve 25 serves to hold sleeve 70 in place against shoulder 77 of sleeve 25 and also serves as a locking nut for the nut 75.

A spring 79, anchored at one end on pin 80 carried by sleeve 70 and at the other end on pin 81 carried by ratchet disc 60, serves to normally hold pin 62 in engagement with lever 48.

In Fig. 3 the parts are shown in the positions occupied when disc 60 has been advanced nearly to the limit of its forward stroke, pin 62 being at that time in engagement with pin 65. Further advancement, in a clockwise direction, of gear 21 and plate 26 will, because of the engagement of pin 62 with lever 48, cause said lever to swing upon its pivot against the action of spring 54 so as to withdraw shoulder 49 from beneath finger 39 of lever 38, whereupon spring 56 will swing lever 38 clockwise to initial position.

The left hand arm of lever 46, during the major portion of the above-mentioned movement of lever 48 is obstructed by finger 44 of lever 37. When shoulder 49 is fully retracted from finger 39 of lever 38 said lever will be released and swung in a clockwise direction by spring 56, the lever 38 positively engaging the finger 40 of lever 37 and thus positively retracting pawl 36 from the ratchet teeth 24, at the same time shifting finger 44 to the left to permit shoulder 45 of lever 46 to drop down behind it to definitely lock pawl 36 in a retracted position relative to the ratchet teeth.

Plate 26 is thus released from the driven connection with gear 21 and spring 29 acts to return said plate, and the connected cam sleeve unit to initial position, finger 60' coming into engagement with stop pin 66 and the anchor end of lever 38 coming into engagement with stop pin 63, shortly after finger 60' has been stopped by finger 66. The engagement of lever 38 with stop pin 63 swings said lever in a counter-clockwise direction so as to restore its finger 39 to permit notch 49 of lever 48 to swing to locking position beneath finger 39 and this movement brings pin 51 of lever 48 into engagement with latch lever 46 to retract its shoulder 45 from finger 44 of lever 37, thus permitting spring 41 to restore engagement of pawl 36 with teeth 24.

In order that the cam unit may be automatically restored to initial position from any selected point in its travel I provide a pawl 90 pivoted at 91 on one arm of a lever 92. This pawl is normally urged inwardly to engagement with the ratchet teeth 61 of disc 60 by a spring 93 and this spring-urged movement relative to lever 92 is limited by stop pin 94 carried by lever 92.

The other end of lever 92 is connected by link 95 with a lever 96 which carries the armature 97 of a relay 98 which, when energized, serves to drive pawl 90 in a direction to angularly shift disc 60 a distance sufficient to cause its pin 62 to actuate lever 48 in the same way that said lever is actuated when finger 60' is stopped by stop finger 65, so as to retract pawl 36 from teeth 24. Armature 97 is normally biased away from the core of coil 98 by a counterweight 97'.

If it is desired that the ratchet mechanism be not releasable through any particular range of movement, ratchet teeth 61 of disc 60 may be omitted through a suitable arc so that pawl 90 will be ineffective through that range.

In order that the pawl 90 may not offer frictional resistance to forward movement of disc 60, it is held normally retracted from the ratchet teeth by a stop pin 99.

The above-described device was primarily designed to control a stoker mechanism in such manner that proportionate charges of fuel may be delivered to a furnace at variably-spaced periods and for variable time periods in accordance with the heat-demands of the space to be heated, and also to deliver coal to the furnace, even though there be no heat demand from the space to be heated, such delivery being spaced a definite time interval after the delivery of coal to the furnace in response to room temperature demand. For such use it would be apparent that suitable circuit-controlling switches will be associated with the cam elements, relay and motor, some arrangements of which may be common and well-known and other arrangements of which may be novel, but as these form no part of my present invention, they have not been illustrated in the drawings.

The term "oscillating driven element" as used in the claims, is intended to be of sufficient breadth to include a reciprocating element because it is readily apparent that the element 60 might be a reciprocatory rack coordinated with plate 26.

The one-way engagement between levers 37 and 38 permits the necessary freedom of ratchet 36 relative to teeth 24.

Failure of any one of the springs would not permit damage of the apparatus due to an excessive forwarding action of the ratchet drive because, finger 60' being positively driven against stop pin 65, pin 62, engaging lever 48, will swing it counter-clockwise to drive its finger 52 against lever 38 which, moving counter-clockwise and engaging finger 40, will retract pawl 36 from ratchet teeth 24 so that the motor may proceed without damage to the apparatus. If spring 29 has become ineffective the parts will remain in their most advanced position; if spring 41 has become ineffective, the coaction of pawl 36 with teeth 24 through said range will be ineffective; if either spring 54 or 56 has become ineffective there will be merely a delayed coaction between levers 38 and 48.

I claim as my invention:

1. A snap-back driving train comprising, a rotary driver, an oscillatory driven element, a pawl carried by the driven element and adapted to engage the driver, a retracting lever carried by the driven element, a one-way connection between the pawl and retracting lever in pawl-retracting direction, a latch carried by the driven element and arranged to hold the retracting lever in pawl-activating position, means for driving the retracting lever in pawl-retracting direction, means for shifting said latch to release position, a latch arranged to hold the pawl in retracted position, a one-way connection between the two latches to retract the second latch from pawl-retaining position when the first latch is in position to retain the retracting lever in inactive position, means arranged in the path of movement of the second latch to retract it upon completion of a forward stroke of the driven element, means for restoring the retracting lever to inactive position at the end of each return stroke of the driven element, and a spring yieldingly urging the driven element in reverse direction.

2. A snap-back driving train comprising, a rotary driver, an oscillatory driven element, a pawl carried by the driven element and adapted to engage the driver, a retracting lever carried by the driven element, a one-way connection between the pawl and retracting lever in pawl-retracting direction, a yielding connection between the pawl and retracting lever in pawl-restoring direction, a latch carried by the driven element and arranged to hold the retracting lever in pawl-activating position, means for driving the retracting lever in pawl-retracting direction, means for shifting said latch to release position, a latch arranged to hold the pawl in retracted position, a one-way connection between the two latches to retract the second latch from pawl-retaining position when the first latch is in position to retain the retracting lever in inactive position, means arranged in the path of movement of the second latch to retract it upon completion of a forward stroke of the driven element, means for restoring the retracting lever to inactive position at the end of each return stroke of the driven element, and a spring yieldingly urging the driven element in reverse direction.

3. In combination with mechanism of the character specified in claim 1, a finger arranged to engage the first latch in retracting direction, a yielding driving connection between the driven element and said finger, a pawl arranged to shift said finger in reverse direction at intermediate points in its forward travel, and means for actuating said pawl.

4. In combination with mechanism of the character specified in claim 2, a finger arranged to engage the first latch in retracting direction, a yielding driving connection between the driven element and said finger, a pawl arranged to shift said finger in reverse direction at intermediate points in its forward travel, and means for actuating said pawl.

5. A snap-back driving train comprising, a rotary driver, an oscillatory driven element, a pawl-and-ratchet connection between the driver and driven element, latching means carried by the driven element for holding the pawl in ineffective position, means carried by the driven element for holding said latching means in ineffective position, means arranged at the limit of forward movement of the driven element for shifting said latch-holding means to cause the pawl to shift to and be latched in ineffective position, means arranged at the limit of reverse movement of the driven element to retract the latching means from the pawl, and a spring yieldingly urging the driven element in reverse direction.

6. In combination with mechanism of the character specified in claim 5, a finger arranged to shift the latch-holding means to ineffective position, a yielding driving connection between the driven element and said finger permitting reverse actuation of said finger during forward movement of the driver, a pawl arranged to shift said finger in reverse direction at intermediate points in its forward travel, and means for actuating said pawl.

7. A snap-back driving train comprising, a rotary driver, an oscillatory driven element, a pawl journalled on the driven element, a lever connected to said pawl, pawl-retracting lever journalled on the driven element and engaging the first-mentioned lever with limited angular play, a latch pivoted on the driven element and arranged to hold the first-mentioned lever in pawl-retracting position, a second latch pivoted on the driven element and arranged to hold the latch-retracting lever in position permitting effective positioning of the pawl, a one-way engagement between the two latches producing alternate effective positioning of said latches, means to shift the second latch to ineffective position at the end of forward travel of the driven element, means to shift the pawl-retracting lever to retracting position at the end of reverse travel of the driven element, and a spring urging the driven element in reverse direction.

8. In apparatus of the character described in claim 7, a finger arranged to normally travel forwardly with the driven element and to be shiftable reversely to retract the second latch, a pawl arranged to reversely shift said finger at intermediate points in its forward travel, and means for shifting said pawl.

9. In apparatus of the character specified in claim 7, a finger carried by the second latch and positioned to engage the pawl-retracting lever in pawl-retracting direction only when said second latch is withdrawn from lever-retaining position.

10. A snap-back driving train comprising, a rotary driver, an oscillatory driven element coaxial with the driver, a spearable driving connection between the driver and driven element, a detent carried by one of said elements and operative to hold the separable driving connection in ineffective position during reverse movement of the oscillatory element, means movable with the oscillatory element for moving the separable connection to ineffective position, means for actuating said last-mentioned means, means for producing reverse movement of the oscillatory element when released from the driver, and means effective upon restoration of the oscillatory element to initial position to withdraw the detent.

In witness whereof, I have hereunto set my hand at Wabash, Indiana, this 16 day of April, A. D. one thousand nine hundred and thirty-one.

JAMES O. DAVIS.